United States Patent
Granata et al.

(10) Patent No.: US 11,624,382 B2
(45) Date of Patent: Apr. 11, 2023

(54) PIVOTING FASTENER ASSEMBLY AND METHOD FOR MANUFACTURING SAME

(71) Applicant: Eypex Corporation, Auburn Hills, MI (US)

(72) Inventors: Robert Granata, Bloomfield Hills, MI (US); Clarence Martin, Bloomfield Township, MI (US)

(73) Assignee: EYPEX CORPORATION, Auburn Hills, MI (US)

( * ) Notice: Subject to any disclaimer, the term of this patent is extended or adjusted under 35 U.S.C. 154(b) by 0 days.

(21) Appl. No.: 17/235,581

(22) Filed: Apr. 20, 2021

(65) Prior Publication Data

US 2021/0324884 A1    Oct. 21, 2021

Related U.S. Application Data

(60) Provisional application No. 63/012,317, filed on Apr. 20, 2020.

(51) Int. Cl.
| | | |
|---|---|---|
| *F16B 1/00* | (2006.01) | |
| *H01F 7/02* | (2006.01) | |
| *B29C 70/68* | (2006.01) | |
| *B29L 31/00* | (2006.01) | |

(52) U.S. Cl.
CPC ............... *F16B 1/00* (2013.01); *B29C 70/68* (2013.01); *H01F 7/02* (2013.01); *B29K 2995/0008* (2013.01); *B29L 2031/727* (2013.01); *F16B 2001/0035* (2013.01)

(58) Field of Classification Search
CPC .. F16B 1/00; F16B 2001/0035; F16B 11/006; B29C 70/68; B29C 70/78; B29C 45/14; H01F 7/02; H01F 7/0252; B29K 2995/0008; B29L 2031/727
See application file for complete search history.

(56) References Cited

U.S. PATENT DOCUMENTS

| | | | |
|---|---|---|---|
| 6,857,809 B2 | 2/2005 | Granata | |
| 7,435,031 B2 | 10/2008 | Granata | |
| 7,922,135 B2 | 4/2011 | Granata | |
| 8,615,852 B2 * | 12/2013 | Smith | B60R 13/0206 24/457 |
| 9,499,108 B2 * | 11/2016 | Dickinson | F16B 5/123 |
| 10,363,971 B2 * | 7/2019 | Ortega Garcia | B60R 13/0206 |
| 2002/0197107 A1 * | 12/2002 | Granata | F16B 5/0628 403/381 |

(Continued)

*Primary Examiner* — David M Upchurch
(74) *Attorney, Agent, or Firm* — Reising Ethington P.C.

(57) ABSTRACT

A pivoting fastener assembly for securely fastening a panel in spaced relation to a support backing, and a method of manufacturing the same. The fastener assembly includes: a magnet-carrier assembly that includes a magnet that is fixed to a carrier member; and a base member that includes a base portion and a pivoting portion. The pivoting portion includes a head, a trunk, and an extension portion that is connected to the base portion. The extension portion includes a top side that connects a first peripheral surface to a second peripheral surface of the extension portion. A first end of the trunk is connected to the top side of the extension portion and a second end of the trunk is connected to the head. The base member is a unitary piece, and the head of the pivoting portion engages and retains the carrier member of the magnet-carrier assembly.

14 Claims, 7 Drawing Sheets

(56) References Cited

U.S. PATENT DOCUMENTS

2004/0258471 A1* 12/2004 Granata ................ F16B 5/0628
    403/381
2011/0140474 A1* 6/2011 Smith .................... B62D 27/06
    296/35.1
2015/0283957 A1* 10/2015 Dickinson ........... B60R 13/0206
    24/303
2018/0170283 A1* 6/2018 Liu ..................... B60R 13/0212
2019/0271343 A1* 9/2019 Perez Hernandez ... F16B 21/12
2019/0344728 A1* 11/2019 Vargas Linan ............ F16B 1/00

* cited by examiner

PIVOTING FASTENER ASSEMBLY AND METHOD FOR MANUFACTURING SAME

FIELD OF THE INVENTION

The present invention relates generally to fasteners and, more particularly, to pivoting or articulating fastener assemblies.

BACKGROUND OF THE INVENTION

It is known in the related art to use a panel-mounting fastener assembly for attaching a decorative panel of a vehicle, such as an automobile, to an overlying or underlying sheet-metal support member. The decorative panel may include a headliner, a door panel, a seat-back panel, or another panel typically having a support backing onto which there is bonded decorative material. The decorative panel may include a resinous-impregnated fibrous-bat material for the support backing and foam-backed upholstery for the decorative material. When the decorative panel includes a headliner, the sheet-metal support member may be a roof beam extended across the roof of the vehicle for providing rigidity to the sheet-metal support member and mounting structure for the headliner.

More specifically, in many automobiles, the headliner spans substantially the entire upper surface of the passenger compartment of the automobile. The sheet-metal support member is disposed coextensively with and adjacent the headliner opposite the passenger compartment to define substantially the entire interior surface of the roof of the vehicle body. The headliner is assembled to the vehicle body by attaching the headliner to the sheet metal via a plurality of fasteners. In the assembled state, each fastener holds the surface of the headliner to an adjacent part of the sheet metal.

Earlier panel-mounting fastener assemblies generally include a magnet held by a carrier member, which is then attached to a base member that is then attached to the headliner. The magnet holds the panel-mounting fastener assembly to the sheet metal, such as the interior of a vehicle roof. Such panel-mounting fasteners include numerous components that are manufactured separately, and then mechanically connected to one another. Manufacturing and assembly of these multiple, distinct parts can result in unnecessary complications and expenditure of resources.

It would be desirable to manufacture or provide a pivoting fastener assembly that overcomes at least some of the deficiencies of the prior pivoting fastener assemblies and their associated manufacturing processes as discussed above.

SUMMARY OF THE INVENTION

According to an embodiment, there is provided an attachment mechanism adapted for use to connect a panel with a vehicle support backing. The attachment mechanism comprises a locating block adapted to be inserted into an opening in the header of a vehicle. The attachment mechanism further comprises a base member defining a center portion and at least one trough adjacent an edge of the center portion. The locating block extends from the center portion of the base member. The attachment mechanism further comprises at least one magnet disposed in the trough and adapted to connect with the support backing of the vehicle. The locating block is adapted to position the attachment mechanism relative to the header and the magnet is adapted to retain the locating block and base member in position on the support backing.

According to another embodiment, there is provided a method of manufacturing a pivoting fastener assembly configured to securely fasten a panel in spaced relation to a support backing, comprising: attaching a magnet to a carrier member to form a magnet-carrier assembly; carrying out an over-molding process so as to form a base member that includes a base portion and a pivoting portion having a head, wherein the over-molding process includes causing mold material to flow into a mold in which the magnet-carrier assembly in situated so that, when the mold material is cooled, the magnet-carrier assembly becomes fixed to and/or retained by the head of the pivoting portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
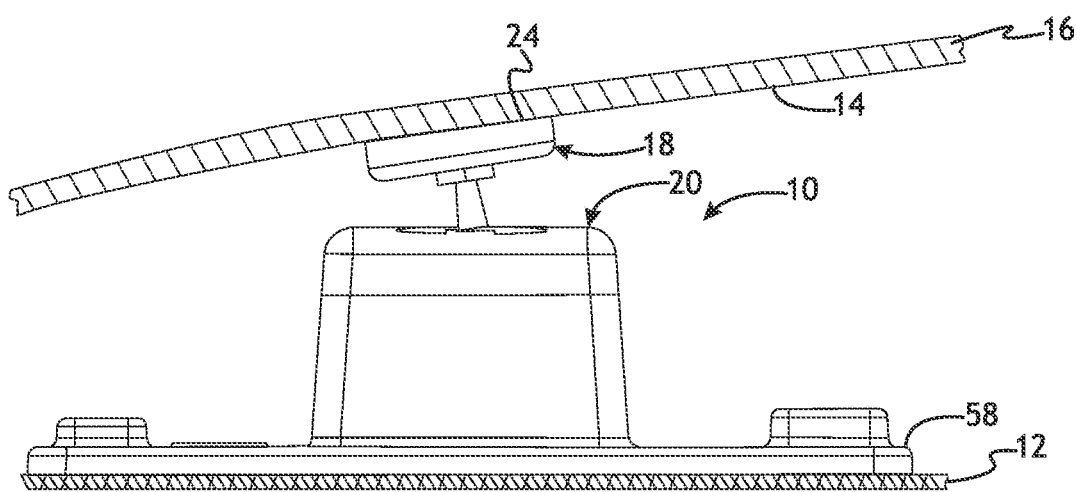
FIG. 1 is a cross-sectional side view of a vehicle having a headliner that is held to an interior surface of a vehicle roof by a pivoting fastener assembly.
Figure 2:
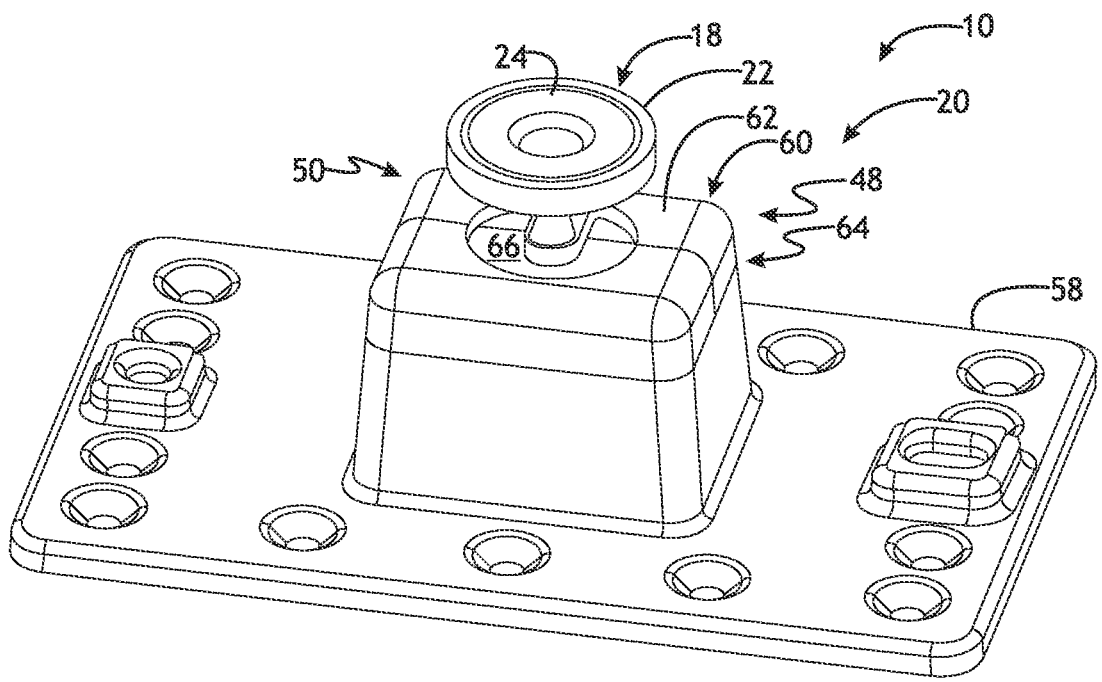
FIG. 2 is a perspective view of a first embodiment of a pivoting fastener assembly.
Figure 3:
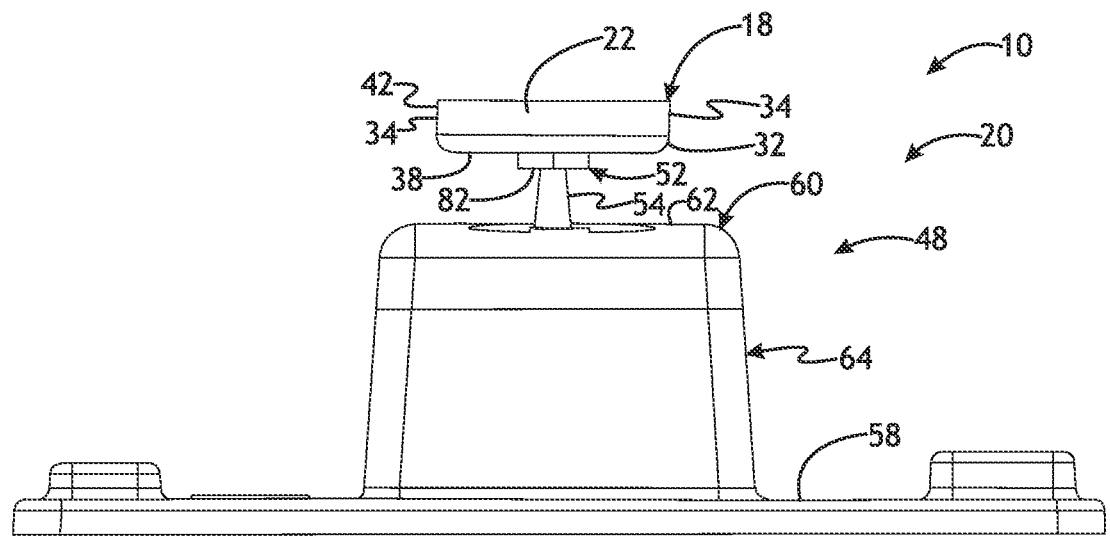
FIG. 3 is a side view of the pivoting fastener assembly according to the first embodiment.
Figure 4:
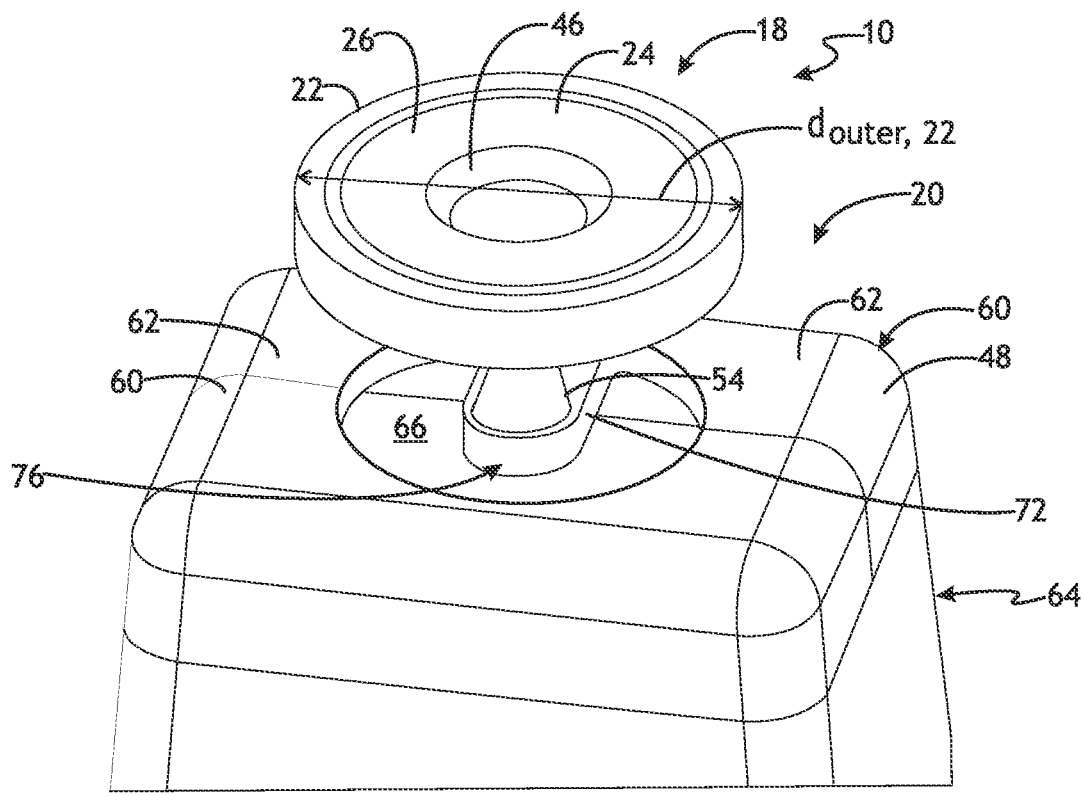
FIG. 4 is a perspective view of the pivoting fastener assembly according to the first embodiment.
Figures 5, 6:
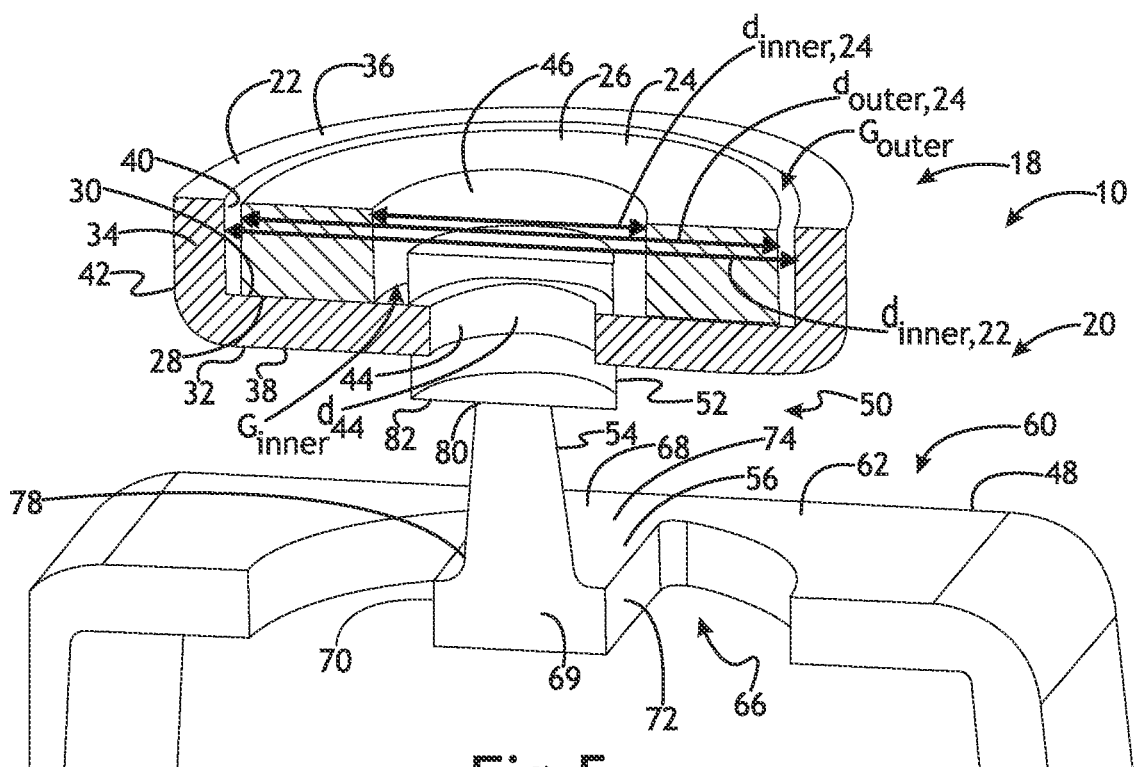
FIG. 5 is a cross-sectional view of the pivoting fastener assembly according to the first embodiment.
FIG. 6 is a perspective view of the pivoting portion of the fastener assembly according to the first embodiment.
Figure 7:
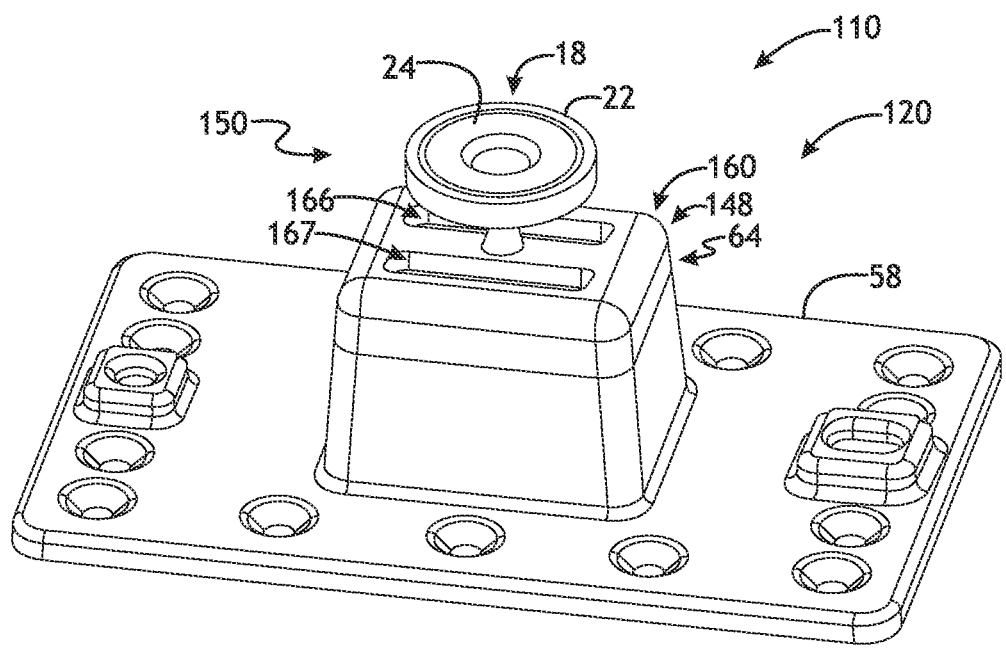
FIG. 7 is a perspective view of a second embodiment of a pivoting fastener assembly.
Figure 8:
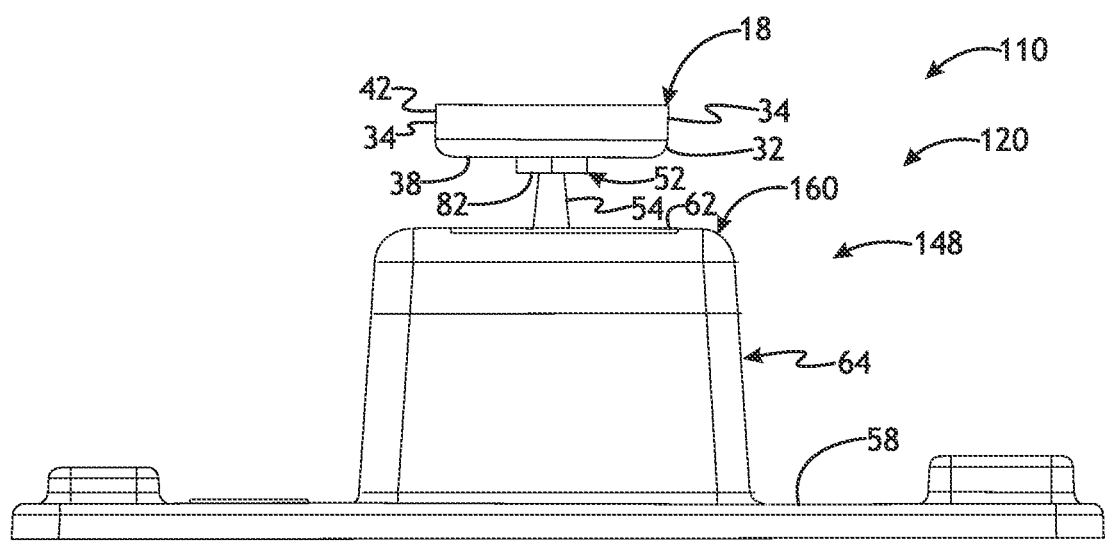
FIG. 8 is a side view of the pivoting fastener assembly according to the second embodiment.
Figure 9:
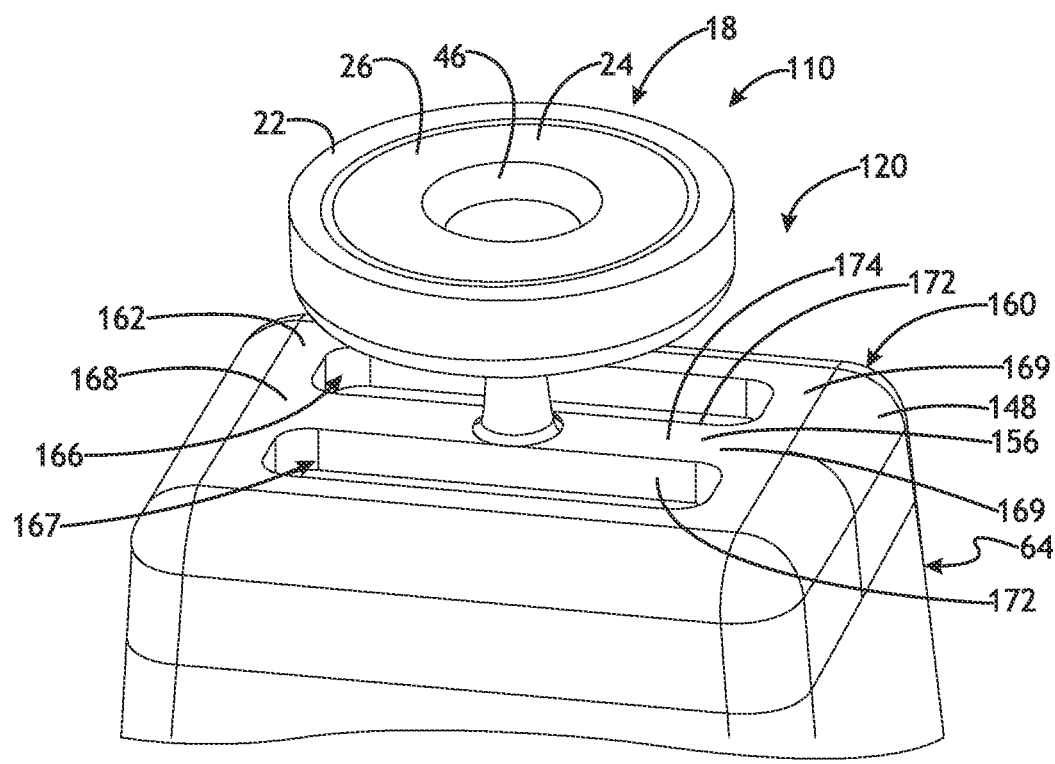
FIG. 9 is a perspective view of the pivoting fastener assembly according to the second embodiment.
Figure 10:
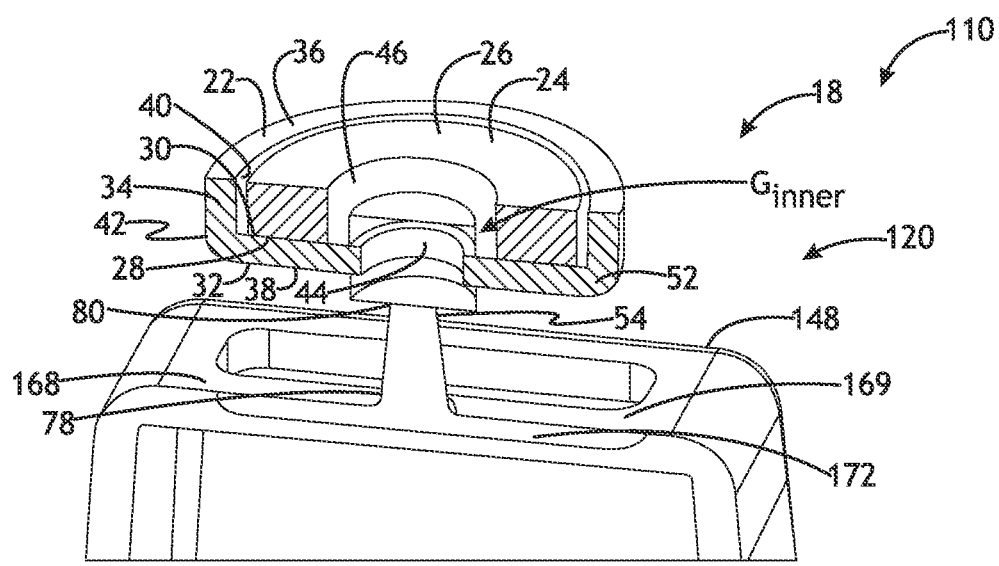
FIG. 10 is a cross-sectional view of the pivoting fastener assembly according to the second embodiment.

With reference to FIGS. 1-6, a first embodiment of a pivoting fastener assembly is generally shown at 10. The pivoting fastener assembly 10 is adapted for holding a panel, such as a vehicle headliner 12 to an interior or support surface 14 of a vehicle. The support surface can be a roof, which is generally shown at 16. As is best shown in FIGS. 2-6, the pivoting fastener assembly 10 includes a magnet-carrier assembly 18 and a base member 20. The magnet-carrier assembly 18 includes a carrier member 22 and a magnet 24. The magnet 24 is a permanent magnet that produces a magnetic field and attracts ferromagnetic materials, such as certain sheet metals, toward a top surface 26 of the magnet 24. A bottom surface 28 of the magnet 24 is fixed to an interior surface 30 of the carrier member 22. The bottom surface 28 of the magnet 24 can be fixed to the interior surface 30 of the carrier member 22 via any of a variety of attachment means, including adhesives and mechanical interference (or complimentary locking members). In the first embodiment of FIGS. 2-6, the bottom surface 28 of the magnet 24 is fixed to the interior surface 30 of the carrier member 22 via an adhesive applied therebetween.

The carrier member 22 includes the interior surface 30, a base 32, an outer wall 34, and a central hole 44. The base 32 is defined by the interior surface 30 and an exterior surface 38. The outer wall 34 is defined by a top surface 36, an interior surface 40, and an exterior surface 42, all of which are annularly-shaped. The base 32 is circularly-shaped (when viewed in the x-y plane) and the outer wall 34 is integrally connected to a periphery of the base 32 such that the carrier member 22 is cylindrically shaped. The exterior regions in which the base 32 and outer wall 34 meet are rounded or radiused; however, in other embodiments, a sharp edge may be used. The central hole 44 of the base 32 is circular in shape (when viewed in the x-y plane) and whose size is defined by a central hole diameter $d_{44}$.

In the illustrated embodiment, the carrier member 22 includes an inner diameter $d_{inner,22}$ that is defined as the inner diameter of the circularly-shaped outer wall 34, which extends between opposing portions of the interior surface 40 of the outer wall 34. The magnet 24 includes an outer diameter $d_{outer,24}$ and an inner diameter $d_{inner,24}$. The inner diameter $d_{inner,22}$ of the carrier member 22 is greater than the outer diameter $d_{outer,24}$ of the magnet 24, and the magnet 24 is held within the carrier member 22 in a manner such that an interior surface of the outer wall 34 of the carrier member 22 surrounds or circumscribes the magnet 24. An annular gap $G_{outer}$ can be provided between the outer circumferential wall of the magnet 24 and the interior surface 40 of the outer wall 34 of the carrier member 22. The magnet 24 and the carrier member 22 are attached such that an inner hole 46 of the magnet 24 is concentric with the central hole 44 of the carrier member 22. The inner diameter $d_{inner,24}$ of the magnet 24 is greater than the central hole diameter $d_{44}$ of the central hole 44 of the base 32. The central hole 44 is concentric with the inner hole 46 of the magnet 24 and the outer wall 34 of the carrier member 22.

The base member 20 includes a base portion 48 and a pivoting portion 50. The pivoting portion 50 includes a head 52, a trunk 54, and an extension portion 56 that is integrally connected to the base portion 48 and that extends in a first direction, which is a direction along axis x, as shown best in FIGS. 5-6. The base portion 48 includes a plate member 58 and a raised portion 60. The plate member 58 can be attached to the headliner 12 through the use of various attachment means, including rivets, screws, bolts, complimentary mechanical locking features, and/or adhesive. For example, the plate member 58 includes a plurality of bores that can be used to receive bolts, rivets, or screws so as to connect the pivoting fastener assembly 10 to the headliner. However, in other embodiments, adhesives may be used and, in such embodiments, the bores in the plate member 58 may be omitted. The raised portion 60 includes a raised surface 62 that is integrally connected to the plate member 58 by way of one or more peripheral walls, which are generally indicated at 64. The raised surface 62 includes a hole 66 in which the extension portion 56 extends. In other embodiments, the base portion 48 does not include a raised portion and, in such embodiments, the hole 66 can be provided within the plate member 58. The presence, height, and/or other characteristics of the raised portion can be modified for the particular application in which the pivoting fastener assembly 10 is to be used.

The extension portion 56 has a first end 68 that extends from an inner periphery of the raised surface 62 toward a second or free end 69 in a manner such that the extension portion 56 is cantilevered. The second end 69 of the extension portion 56 is disposed within the center of the hole 66. The extension portion 56 includes a first peripheral surface 70 and a second peripheral surface 72 that opposes the first peripheral surface 70. The extension portion 56 includes a top side 74 that integrally connects the first peripheral surface 70 to the second peripheral surface 72. The top side 74, which in the present embodiment is defined by a top surface, is coplanar with the raised surface 62 and, in embodiments where the raised surface is omitted, the top side 74 can be coplanar with a top surface of the plate member 58. The first peripheral surface 70 and the second peripheral surface 72 are integrally connected via a curved, peripheral end wall 76 that is rounded in a semicircular manner and disposed within the middle of the hole 66 such that the semicircle defines half of a circle that is concentric with the hole 66.

The trunk 54 extends in the second direction (i.e., the z-direction in the present embodiment) from a first end 78 to a second end 80, where the second direction is orthogonal to the first direction (i.e., the x-direction in the present embodiment) and to the plane of the top side 74. The first end 78 of the trunk 54 is integrally connected to the top side 74 of the extension portion 56 at the free end 69 such that the trunk 54 extends upward in a second direction (i.e., a direction that is orthogonal to the first direction), which is a direction along axis z. The trunk 54 is elongated in the second direction, and the outer curved surface of the trunk 54 is tapered inwardly as it extends from the first end 78 to the second end 80.

The second end 80 of the trunk 54 is integrally connected to the head 52. The head 52 is formed within the central hole 44 of the base 32 of the carrier member 22 through an overmolding process in a manner such that the head 52 retains and/or fixedly holds the magnet-carrier assembly 18. The head 52 includes a first interfering portion 82, a second interfering portion 84, and a connecting portion 86 that connects the first interfering portion 82 to the second interfering portion 84. The first interfering portion 82, the second interfering portion 84, and the connecting portion 86 are all cylindrically-shaped. The connecting portion 86 is provided within the central hole 44 of the carrier member 22, and has a diameter that is less than or equal to the diameter $d_{44}$ of the central hole 44. The first interfering portion 82 and the second interfering portion 84 each have a diameter (when viewed in the x-y plane) that is larger than the diameter $d_{44}$ of the central hole 44 of the base 32.

The first interfering portion 82 and the second interfering portion 84 are provided on opposing sides of the base 32 of the carrier member 22 such that the first interfering portion 82 abuts the exterior surface 38 of the base 32 and the second interfering portion 84 abuts the interior surface 30 of the base 32. This arrangement of the first interfering portion 82, the second interfering portion 84, and the connecting portion 86 results in the base 32 of the carrier member 22 being sandwiched between the first interfering portion 82 and the second interfering portion 84 so that the head 52 retains and/or fixedly holds the magnet-carrier assembly 18. Also, an annular gap Ginner is provided between an outer circumferential surface of the second interfering portion 84 and an inner circumferential surface of the magnet 24 that forms the inner hole 46 of the magnet 24. This annular gap Ginner is formed as a part of the overmolding process, which is discussed more below. The height of the second interfering portion 84 (as taken along the z-axis) is less than the height of the magnet 24 and the carrier member 22 (as taken along the z-axis). The height of the magnet 24 and the carrier member 22 (as taken along the z-axis) are the same, although in other embodiments, the height of the magnet 24 exceeds the height of the carrier member 22 (as taken along the z-axis).

The cantilevered design of the pivoting portion 50 enables the head 52 (and, thus, the magnet-carrier assembly 18) to pivot around (or with respect to) the base portion 48 and to exhibit rotation at least about the x-axis and the y-axis. The choice of materials for the base member 20 can be selected so as to allow a particular degree of resiliency of the pivoting portion 50 with respect to the base portion 48.

With reference to FIGS. 7-10, there is shown a second embodiment of a pivoting fastener assembly 110. The pivoting fastener assembly 110 includes many features that are similar or the same as those of the pivoting fastener assembly 10 and that discussion is also attributed to the pivoting fastener assembly 110 to the extent that discussion is not inconsistent with the discussion of the pivoting fastener assembly 110 below.

The pivoting fastener assembly 110 includes the magnet-carrier assembly 18 and the base member 120. The base member 120 includes a base portion 148 and a pivoting portion 150. The pivoting portion 150 includes the head 52, the trunk 54, and an extension portion 156 that is integrally connected to the base portion 148 and that extends in a first direction, which is along they-direction in the present embodiment. The base portion 148 includes the plate member 58 and a raised portion 160. The raised portion 160 includes a raised surface 162 that is integrally connected to the plate member 58 by way of the one or more peripheral walls, which are generally indicated at 64. The raised surface 162 includes two holes 166, 167 between which the extension portion 156 extends. In other embodiments, the base portion 148 does not include a raised portion and, in such embodiments, the holes 166, 167 can be provided within the plate member 58.

The extension portion 156 has a first end 168 that extends from an inner periphery of the raised surface 162 toward a second end 169 in a manner such that the extension portion 156 extends between the first hole 166 and the second hole 167. The first hole 166 and the second hole 167 are the same size and are symmetrical about the extension portion 156 as taken with respect to the y-axis. The extension portion 156 includes a first peripheral surface 170 and a second peripheral surface 172 that opposes the first peripheral surface 170. The extension portion 156 includes a top side 174 that integrally connects the first peripheral surface 170 to the second peripheral surface 172. The top side 174, which in the present embodiment is defined by a top surface, is coplanar with the raised surface 162 and, in embodiments where the raised surface is omitted, the top side 174 can be coplanar with a top surface of the plate member 58 such that the top side 174 corresponds to the surface of the plate member 58.

The design of the pivoting portion 150 enables the head 52 (and, thus, the magnet-carrier assembly 18) to pivot around (or with respect to) the base portion 148 and to exhibit rotation at least about the x-axis and the y-axis. The choice of materials for the base member 120 can be selected so as to allow a particular degree of resiliency of the pivoting portion 150 with respect to the base portion 148.

Figure 11:
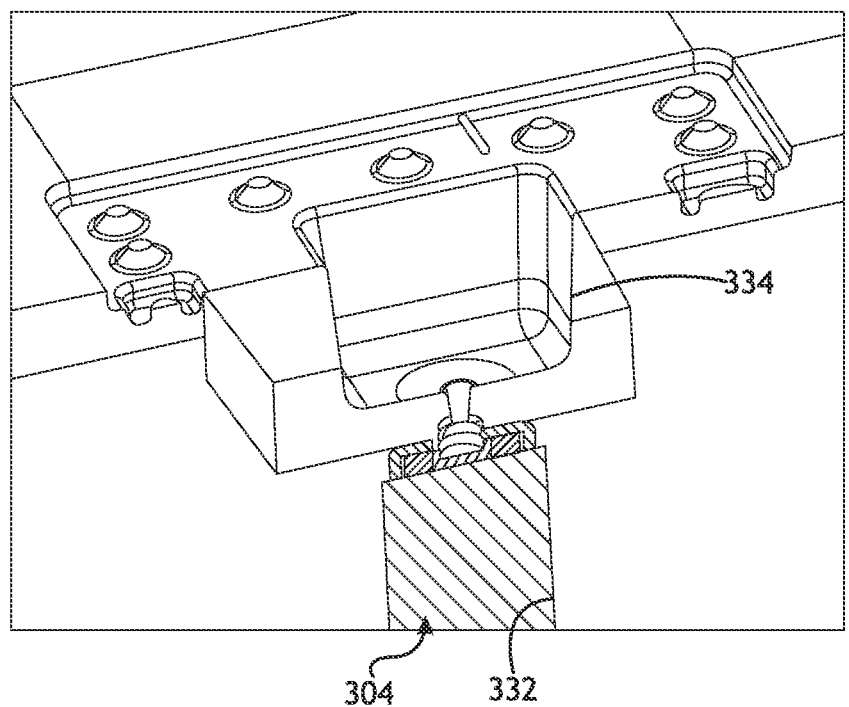
FIG. 11 is a perspective view showing a cross-section of the pivoting fastener assembly according to the first embodiment, as well as a cross-section of a mold and a shut-off tool that is used as a part of the method of manufacturing the pivoting fastener assembly according to the first embodiment.
Figure 12:
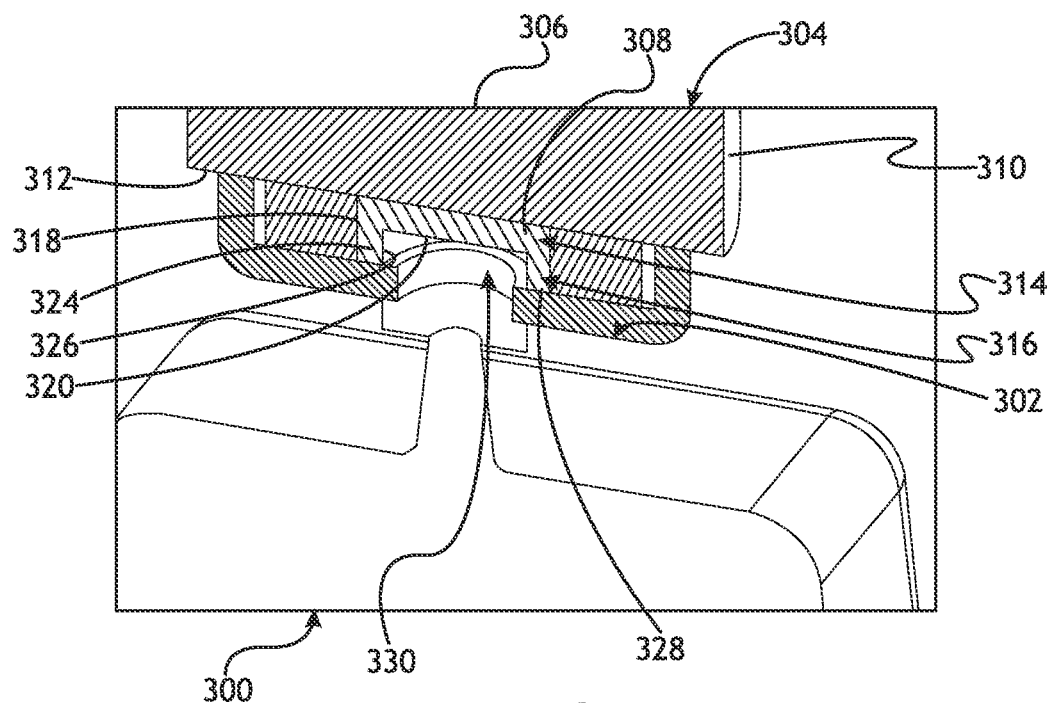
FIG. 12 is another perspective view showing a cross-section of the pivoting fastener assembly according to the first embodiment, as well as a cross-section of a mold and a shut-off tool that is used as a part of the method of manufacturing the pivoting fastener assembly according to the first embodiment.

With reference to FIGS. 11-12, there is shown a mold 300 that is used to form the base member 20 of the pivoting fastener assembly 10. It should be appreciated that this mold 300 can be adapted to form pivoting fastener assemblies according to other embodiments, such as the pivoting fastener assembly 110 discussed above. The mold 300 also includes a seat portion 302 that is designed to engage with the exterior surfaces 38, 42 of the carrier member 22. In other embodiments, the seat portion 302 engages the exterior surface 38 of the base 32 of the carrier member 22, but not the exterior surface 42 of the outer wall 34 of the carrier member 22.

With reference to FIGS. 11-12, there is also shown a shut-off tool 304 that is used to prevent the mold material from contacting the magnet 24. Also, at least according to the present embodiment, the shut-off tool 304 is used to facilitate the attachment of the magnet 24 to the carrier member 22. The shut-off tool 304 includes a body portion 306 and a projecting portion 308. The body portion 306 is cylindrical and is coaxial with the carrier member 22 when the carrier member 22 is seated in the seat portion 302 and when the shut-off tool 304 is provided within a shut-off tool cavity, which is discussed more below. The body portion 306 includes a diameter that is larger than the outer diameter $d_{outer,22}$ of the carrier member 22. The body portion 306 includes an outer circumferential wall 310 and an abutting surface 312 that abuts the top surface 26 of the magnet 24 and the top surface 36 of the carrier member 22. In the pivoting fastener assembly 10, the top surface 26 of the magnet 24 and the top surface 36 of the carrier member 22 are coplanar with one another.

The projecting portion 308 includes a disc portion 314 and a ring portion 316. The disc portion 314 is cylindrical and is coaxial with the inner hole 46 of the magnet 24. The height of the disc portion 314 (as taken along the z-axis) is equal of the height of the inner hole 46 of the magnet (as taken along the z-axis) minus the height of the second interfering portion 84 of the head 52 (as taken along the z-axis). In other embodiments, the height of the outer wall 34 of the carrier member 22 (as taken along the z-axis) is less than the height of the magnet 24 (as taken along the z-axis) such that the magnet 24 extends further in the z-direction than the outer wall 34 of the carrier member 22. In such an embodiment, the abutting surface 312 of the body portion 306 may abut the top surface 26 of the magnet 24, but not the top surface 36 of the carrier member 22, or the body portion 306 may include another surface (not shown) that abuts the top surface 36 of the carrier member 22 along with an annular wall (not shown) that connects the abutting surface 312 and the other surface that abuts the top surface 36.

The disc portion 314 is defined by an outer surface 318 and a bottom surface 320. The bottom surface 320 is circularly-shaped and includes a diameter equal to the diameter of the top surface of the second interfering portion 84 that will be formed. The ring portion 316 is annularly-shaped and includes an annular wall 324. The annular wall 324 is defined by the outer surface 318, an inner surface 326, and a bottom surface 328. The diameter of the disc portion 314 and the outer diameter of the ring portion 316 are the same as the inner diameter $d_{inner,24}$ of the magnet 24. The inner diameter of the ring portion 316 (or the diameter of the inner surface 326) is the same as the diameter of the second interfering portion 84 that will be formed. The bottom surface 320 and the inner surface 326 are used for defining a well 330 that has the shape of the second interfering portion 84 that will be formed.

The mold 300 includes a shut-off tool cavity 332 and mold walls 334. The shut-off tool cavity 332 is complimentary to the body portion 306 of the shut-off tool 304 and to the exterior surfaces 38, 42 of the carrier member 22. The mold walls 334 are contoured in accordance with the shape of the base member 20 of the pivoting fastener assembly 10. The bottom surface 320 of the disc portion 314 of the shut-off tool 304 is also considered a mold wall (although it is separate from the mold 300) as it is used to define the shape of the second interfering portion 84 of the head 52. Additionally, the central hole 44 of the carrier member 22 is filled with mold material as a part of the overmolding process, and defines the shape of the connecting portion 86 of the head 52, which occupies this entire central hole 44 of the carrier member 22.

In one embodiment, the shut-off tool 304 is ferromagnetic such that the magnet 24 is attracted to the abutting surface 312 of the shut-off tool 304. This feature facilitates attachment of the magnet 24 to the carrier member 22 since the magnet 24 is magnetically held to the abutting surface 312 when the shut-off tool 304 is placed within shut-off tool cavity 332. Thus, for example, gravity acts to hold the carrier member 22 against the seat portion 302 of the mold, and the shut-off tool 304 having the magnet 24 magnetically held thereto is then placed downward into the shut-off cavity 332; in this way, the magnetic attraction between the magnet 24 and the shut-off tool 304 will prevent the top surface 26 of the magnet 24 from disengaging the abutting surface 312 of the shut-off tool 304.

Figure 13:
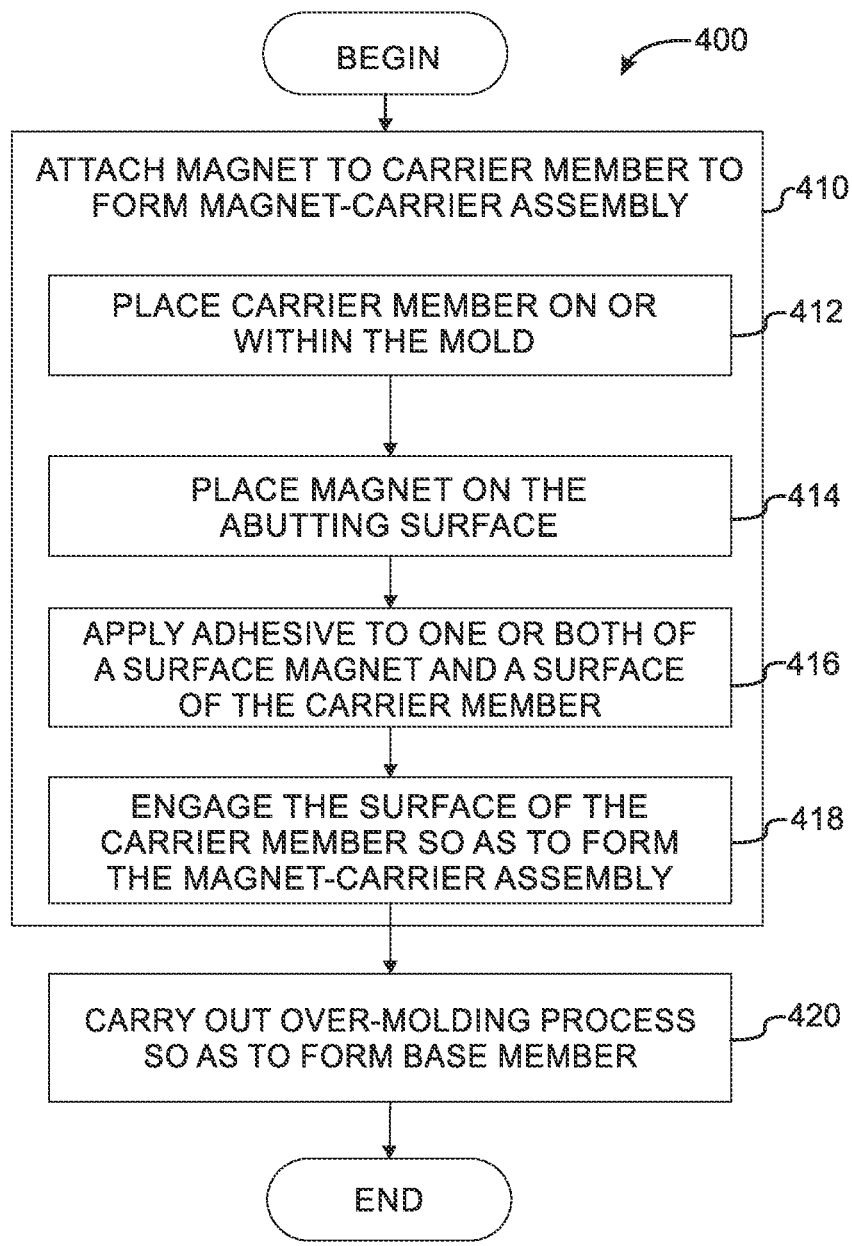
FIG. 13 is a flowchart depicting an embodiment of a method of manufacturing a pivoting fastener assembly.

With reference to FIG. 13, there is shown an embodiment of a method 400 of manufacturing the pivoting fastener assembly. Although the method 400 is described with respect to the pivoting fastener assembly 10, the method can be used (and adapted if necessary) so as to provide for manufacture of other pivoting fastener assemblies, such as the pivoting fastener assembly 110. The method 400 begins with step 410, wherein the magnet is attached to the carrier member to form the magnet-carrier assembly. The magnet 24 is attached to the interior surface 30 of the carrier member 22 via attachment means, such as, for example, adhesives or mechanical interference (e.g., complimentary locking members). In one embodiment, an adhesive is applied to the interior surface 30 of the carrier member 22 and/or the bottom surface 28 of the magnet 24. Then, the interior surface 30 of the carrier member 22 is pressed against the bottom surface 28 of the magnet 24. Pressure and/or heat can be applied to the magnet 24 and/or the carrier member 22 so as to facilitate adhering of the interior surface 30 of the carrier member 22 to the bottom surface 28 of the magnet 24.

In the illustrated embodiment, this step 410 includes: placing the carrier member within a mold (step 412), placing the magnet on a shut-off tool (step 414), applying adhesive to one or both of a surface of the magnet and a surface of the carrier member (step 416), and then engaging the surface of magnet with the surface of the carrier member so as to form the magnet-carrier assembly (step 418). In step 412, the carrier member 22 is placed on or within the mold 300 so that the exterior surfaces 38, 42 of the carrier member 22 engage the seat portion 302. In step 414, the magnet 24 is placed on the abutting surface 312 and the inner hole portion 308 is provided within the inner hole 46 of the magnet 24. In step 416, adhesive to one or both of a surface of the magnet and a surface of the carrier member, which as described above, can be one or both of the interior surface 30 of the carrier member 22 and the bottom surface 28 of the magnet 24.

In step 418, the surface of magnet is engaged with the surface of the carrier member so as to form the magnet-carrier assembly. The interior surface 30 of the carrier member 22 is pressed against the bottom surface 28 of the magnet 24. The alignment of these surfaces that are pressed together is facilitated by the shut-off tool 304. The shut-off tool 304 is placed within the mold 300 that includes shut-off tool cavity walls 332. Thus, as is best shown in FIG. 12, the carrier member 22 is retained within this cavity and the shut-off tool 304 is then placed within this cavity toward the carrier member 22 so that the magnet 24 then is pressed against the interior surface 30 of the carrier member 22. As a result of step 418, the shut-off tool 304 is engaged with the magnet-carrier assembly 18 so as to prevent mold material from contacting the magnet during a molding process. As will be discussed in more detail below, the base member 20, 120 is formed from an overmolding process and the material used for filling the mold in this overmolding process is referred to herein as "mold material." Once the magnet-carrier assembly is formed, the method 400 continues to step 420.

In step 420, an overmolding process is carried out so as to form the base member. The overmolding process includes inserting mold material into the mold 300. The mold material, which is in a liquid state when initially inserted into the mold 300, is then cooled so as to form the solid, base member 20. As is best shown in FIG. 12, the mold material passes through the central hole 44 of the carrier member 22 and into the well 330 of the shut-off tool 304. The mold material then solidifies and forms the base member 20, including the head 52 which fixes and/or retains the magnet-carrier assembly 18 to the base member 20. The method 400 then ends.

Once the pivoting fastener assembly is manufactured, the pivoting fastener assembly can then be used to connect two workpieces, namely, for support panel having a ferromagnetic workpiece, such as sheet metal, to another panel workpiece. For example, the pivoting fastener assembly 10, 110 can be attached to the headliner 12 via adhesives or other attachment means. Then, the magnet 24 (or at least magnet-carrier assembly 18) of the pivoting fastener assembly 10, 110 can be placed so as to abut and magnetically hold on to the interior surface 14 of the vehicle roof. The panel may include various types of panels such as, but not limited to, a headliner, a door panel, a seat-back panel, or another panel typically having a support backing onto which there is bonded decorative material. Further, the panel can be attached to a variety of support backings, such as for example metal structures having a ferromagnetic piece such as a sheet metal of a vehicle roof. It will be appreciated that the panel and support backing may be other structures readily apparent to those skilled in the art.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

What is claimed is:

1. A pivoting fastener assembly for securely fastening a panel in spaced relation to a support backing, the fastener assembly comprising:
a magnet-carrier assembly that includes a carrier member and a magnet, the magnet is fixed to the carrier member; and
a base member that includes a base portion and a pivoting portion, the pivoting portion includes a head, a trunk, and an extension portion that is connected to the base portion and that extends in a first direction, the extension portion includes a first peripheral surface, a second peripheral surface, and a top side that connects the first peripheral surface to the second peripheral surface, a first end of the trunk is connected to the top side of the extension portion, a second end of the trunk is connected to the head, and the trunk extends from the first end to the second end in a second direction that is orthogonal to the first direction,
wherein the base member is one-piece, and the head of the pivoting portion engages and retains the carrier member of the magnet-carrier assembly.

2. The pivoting fastener assembly of claim 1, wherein the carrier member of the magnet-carrier assembly includes a base having an interior surface and a hole, wherein the head of the pivoting member extends through the hole and abuts the interior surface of the base.

3. The pivoting fastener assembly of claim 2, wherein the head includes a first interfering portion and a second interfering portion, wherein the second interfering portion is connected to the first interfering portion by a connecting portion that extends through the hole of the base of the carrier member, and wherein the first interfering portion abuts an exterior surface of the base and the second interfering portion abuts the interior surface of the base so as to engage and retain the carrier member of the magnet-carrier assembly.

4. The pivoting fastener assembly of claim 3, wherein the first interfering portion is connected to the connecting portion at a first side of the first interfering portion and is connected to the second end of the trunk at a second side of the first interfering portion.

5. The pivoting fastener assembly of claim 4, wherein the first peripheral surface and the second peripheral surface each define a part of at least one hole that is provided within the base portion.

6. The pivoting fastener assembly of claim 5, wherein the extension portion extends in the first direction from a first end toward a second end, and wherein the first end is connected to the base portion.

7. The pivoting fastener assembly of claim 6, wherein the second end is a free end that includes a peripheral end wall, and wherein the peripheral end wall is disposed within a first one of the at least one hole of the base portion such that the extension portion is cantilevered with respect to the base portion.

8. The pivoting fastener assembly of claim 6, wherein the at least one hole includes a first hole that is at least partly defined by the first peripheral surface and a second hole that is at least partly defined by the second peripheral surface, and wherein the second end of the extension portion is connected to the base portion.

9. A pivoting fastener assembly for securely fastening a panel in spaced relation to a support backing, the fastener assembly comprising:
a magnet-carrier assembly that includes a carrier member and a magnet, the magnet is fixed to the carrier member; and
a base member that includes a base portion and a pivoting portion, the pivoting portion includes a head, a trunk, and an extension portion that is connected to the base portion and that extends in a first direction, the extension portion includes a first peripheral surface, a second peripheral surface, and a top side that connects the first peripheral surface to the second peripheral surface, a first end of the trunk is connected to the top side of the extension portion, a second end of the trunk is connected to the head, and the trunk extends from the first end to the second end in a second direction that is orthogonal to the first direction,
wherein the base member is a unitary piece, and the head of the pivoting portion engages and retains the carrier member of the magnet-carrier assembly, and
wherein the carrier member of the magnet-carrier assembly includes a base having an interior surface and a hole, wherein the head of the pivoting member extends through the hole and abuts the interior surface of the base and
wherein the head includes a first interfering portion and a second interfering portion, wherein the second interfering portion is connected to the first interfering portion by a connecting portion that extends through the hole of the base of the carrier member, and wherein the first interfering portion abuts an exterior surface of the base and the second interfering portion abuts the interior surface of the base so as to engage and retain the carrier member of the magnet-carrier assembly.

10. The pivoting fastener assembly of claim 9, wherein the first interfering portion is connected to the connecting portion at a first side of the first interfering portion and is connected to the second end of the trunk at a second side of the first interfering portion.

11. The pivoting fastener assembly of claim 10, wherein the first peripheral surface and the second peripheral surface each define a part of at least one hole that is provided within the base portion.

12. The pivoting fastener assembly of claim 11, wherein the extension portion extends in the first direction from a first end toward a second end, and wherein the first end is connected to the base portion.

13. The pivoting fastener assembly of claim 12, wherein the second end is a free end that includes a peripheral end wall, and wherein the peripheral end wall is disposed within a first one of the at least one hole of the base portion such that the extension portion is cantilevered with respect to the base portion.

14. The pivoting fastener assembly of claim 6, wherein the at least one hole includes a first hole that is at least partly defined by the first peripheral surface and a second hole that is at least partly defined by the second peripheral surface, and wherein the second end of the extension portion is connected to the base portion.

* * * * *